(12) United States Patent
Kiffer et al.

(10) Patent No.: US 11,471,818 B2
(45) Date of Patent: Oct. 18, 2022

(54) RADIAL FLOW ADSORPTION VESSEL WITH AN INTEGRATED LOADING DEVICE

(71) Applicant: Air Products and Chemicals, Inc., Allentown, PA (US)

(72) Inventors: Micah S. Kiffer, Kutztown, PA (US); William Eric Karlson, Center Valley, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 168 days.

(21) Appl. No.: 16/910,524

(22) Filed: Jun. 24, 2020

(65) Prior Publication Data
US 2021/0402346 A1    Dec. 30, 2021

(51) Int. Cl.
*B01D 53/04*       (2006.01)
*B01J 8/00*        (2006.01)

(52) U.S. Cl.
CPC .......... *B01D 53/0431* (2013.01); *B01J 8/003* (2013.01); *B01D 53/0407* (2013.01); *B01D 2259/401* (2013.01); *B01D 2259/402* (2013.01); *B01D 2259/403* (2013.01); *B01D 2259/4148* (2013.01)

(58) Field of Classification Search
CPC ................ B01D 53/04; B01D 53/0407; B01D 53/0431; B01D 2259/401; B01D 2259/402; B01D 2259/403; B01D 2259/41; B01D 2259/4148; B01J 8/002; B01J 8/003; B65G 69/0441
See application file for complete search history.

(56) References Cited

U.S. PATENT DOCUMENTS

| | | | | |
|---|---|---|---|---|
| 2,655,273 A | * | 10/1953 | Snow ....................... | B01J 8/003 422/216 |
| 2,917,455 A | * | 12/1959 | Frellick ................... | B01J 8/003 422/216 |
| 3,131,031 A | * | 4/1964 | Pool ........................ | B01J 8/003 422/219 |
| 5,232,479 A | | 8/1993 | Poteau et al. | |

(Continued)

FOREIGN PATENT DOCUMENTS

CN      103357243 A    10/2013

OTHER PUBLICATIONS

KCH Services: Carbon Adsorption Systems. Accessed Feb. 3, 2022 at http://kchservices.com/products/carbon-adsorption-systems via web.archive.org. (Year: 2019).*

*Primary Examiner* — Gabriel E Gitman
(74) *Attorney, Agent, or Firm* — Matthew R. Weaver

(57) ABSTRACT

A radial flow adsorption vessel comprising a cylindrical outer shell having a top end and a bottom end, the top end is enclosed by a vessel head that provides a centrical opening usable as a port to introduce or remove adsorbent particles into or from the vessel; at least one annular adsorption space disposed inside the shell, the at least one annular adsorption space defined by an outer and inner cylindrical porous wall, both co-axially disposed inside the shell; and a loading device for the adsorbent particles positioned above the at least one annular adsorption space at the top end of the vessel, the loading device comprises at least one conical element that extends radially to the outer cylindrical porous wall, the at least one conical element provides a plurality of orifices arranged at least in a region sitting above the at least one annular adsorption space.

18 Claims, 10 Drawing Sheets

(56) References Cited

U.S. PATENT DOCUMENTS

| | | | |
|---|---|---|---|
| 5,296,202 A | 3/1994 | Souers et al. | |
| 5,324,159 A | 6/1994 | Nowobilski et al. | |
| 5,836,362 A * | 11/1998 | Ackley | B01D 53/0407 |
| | | | 141/34 |
| 5,964,259 A | 10/1999 | Ackley et al. | |
| 6,866,075 B2 | 3/2005 | Whitley et al. | |
| 2003/0205130 A1 * | 11/2003 | Neu | B01D 53/0431 |
| | | | 96/132 |
| 2015/0007722 A1 * | 1/2015 | Rodrigues | B01D 53/0446 |
| | | | 96/152 |
| 2019/0291078 A1 * | 9/2019 | Weist, Jr. | B01J 20/28052 |

* cited by examiner

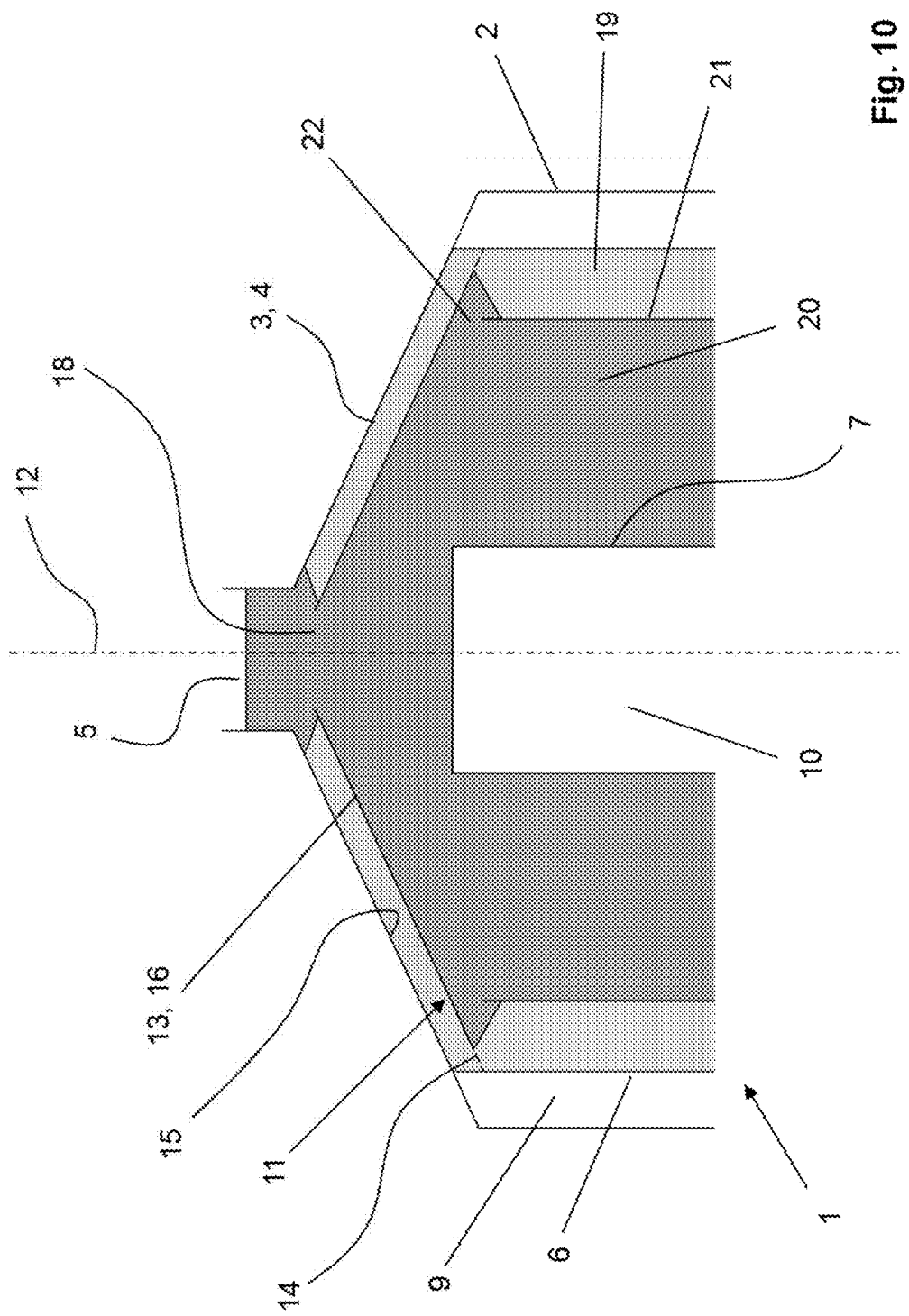

RADIAL FLOW ADSORPTION VESSEL WITH AN INTEGRATED LOADING DEVICE

FIELD

The present invention relates to a radial flow adsorption vessel comprising an integrated loading device for an adsorbent as well as a process for filling the inventive radial flow adsorption vessel with the adsorbent. In a further aspect, the present invention relates to an adsorption process.

BACKGROUND

Purification of gases by adsorption often requires the removal of multiple impurities from a gas stream. While this can sometimes be done using a single adsorbent layer, it is often more economical to use at least two different adsorbents to optimize the adsorption process. In conventional axial flow vessels, this is easily achievable by loading particulate materials sequentially to create distinct layers perpendicular to the fluid flow path. However, radial flow adsorption vessels require annular adsorption spaces for the distinct layers to be perpendicular to the fluid flow path which are usually created by cylindrical barriers disposed within the vessel.

Typically, radial flow adsorption vessels comprise an outer shell and porous walls, such as an inner and outer porous wall, which are formed of a perforated plate usually made out of metal for rigidity and strength with a fine wire mesh overlay to retain the adsorbent particles between the porous walls. These porous walls create the annular adsorption space(s) wherein adsorbent particles can be loaded.

The loading process of such a radial flow adsorption vessel requires usually specialized equipment that must be stored, maintained and shipped to the different locations as well as a significant expertise on-site for the loading operation.

Most of the devices used for the loading operations are rotary devices. Such rotary devices that throw the sieve outward suffer from shadowing of the inner porous wall when used with radial flow vessels, as the adsorbent particles have a minimum radial velocity when they leave the loader required to avoid hitting the top of said wall. The adsorbent particles continue to move outward, thereby leaving an unfilled space or shadow around the outside of the inner porous wall.

Further, said rotary devices are difficult to install inside a vessel head and have whenever installed to be aligned in regard to their concentricity within the vessel.

U.S. Pat. No. 5,296,202 discloses an apparatus for simultaneously distributing catalyst particles across the full diameter of catalyst bed with a single rotor. The bed has substantially a uniform high density by forming a multiplicity of annular rings of catalyst concentric with the vessel or bed center. Such action is achieved without varying rotor speed by deflecting catalyst from a feed hopper into a plurality of arcuate sectors or portions of different radial lengths on a rotating disk-like member. Preferably, each arcuate portion has a volume proportional to one of the annular areas of the bed within the cross-sectional area of the vessel. The desired volume is formed by the radial length of the arcuate sector, its included angle on the disk, and the height of the vanes separating adjacent sectors. The volume is maintained by flow of catalyst into the sectors at a rate to maintain such volumes full at the constant speed of rotation of the disk-like member so that each annular ring is simultaneously formed across the bed with minimum overlap.

U.S. Pat. No. 5,324,159 discloses a particle loader adapted to provide a uniform flow of adsorbent particles across the cross sectional area of an adsorption vessel.

U.S. Pat. Nos. 5,836,362 and 5,964,259 disclose each a particle loader assembly for loading particles into a vessel to form a particle bed comprising inner and outer radially disposed concentric layers of particles, said inner layer containing at least one type of particle of different granulometry or composition or both from a type of particle contained in said outer layer.

U.S. Pat. No. 6,866,075 B2 discloses an apparatus for dispersing particles flowing from an orifice comprising a deflecting surface disposed relative to the orifice, wherein the deflecting surface is fixed relative to the orifice, whereby particles flowing from the orifice can impinge upon and can be dispersed by the deflecting surface, wherein the orifice is one of a plurality of orifices disposed in a wall of a conduit, and wherein the conduit has an axis which is oriented between about 45 degrees and about 70 degrees from the vertical such that particles can flow through the conduit and through the orifices by gravity.

U.S. Pat. No. 5,232,479 discloses an adsorber comprising annular superposed beds, wherein the adsorber contains in its upper zone a device to maintain and compress the upper bed, a flexible impervious membrane which separates the lower bed from the upper bed in its intermediate zone, and a cylindrical wall defining an internal annular duct for the lower bed in its lower zone.

CN 103357243 A discloses an oxygen production adsorption tower comprising a cylindrical tower body, an gas inlet assembly disposed at the bottom of the tower body, a gas outlet assembly disposed at the top of the adsorption assembly, an adsorption assembly disposed in the tower body and a circular gas transportation cavity formed between the inner wall of the tower body and the outer wall of the adsorption wall, wherein the gas inlet assembly is provided with a circular gas vent disposed at the periphery of the lower end of the adsorption assembly.

In this regard, it has been found that there is still a need to provide an improved radial flow adsorption vessel, especially to provide a vessel that enables to save time during the filling operation of an adsorbent material by reducing the need to install and align any equipment within the vessel. In addition, the vessel should allow a uniform high-density adsorbent particle packing. The flow distribution in a packed adsorbent layer strongly depends on packing density so that a uniform flow distribution is critical to the performance of adsorption systems. Furthermore, a densely packed adsorbent layer will settle far less in operation. If the adsorbent layer is loosely packed, fluid forces can allow particles to shift into voids during operation. This can lead to an undesired settling at the top of the adsorbent layer, even if the adsorbent particles provide uniform size and shape.

SUMMARY

The present invention aims at providing a radial flow adsorption vessel which allows for solving or at least alleviating the above mentioned problems.

The invention is based on the basic finding that to achieve a uniform density within an adsorbent layer, each adsorbent particle must be allowed to fall and come to a rest before it is impacted by another falling particle. This prevents particles from being propped up by other particles with large voids between them. To achieve this the particles must be dispersed, i.e. the particles must fall individually and not in a large group, they must be dropped at a controlled rate that is slower than a critical rate of particle flux at the adsorbent layer surface, and they must be distributed uniformly over the entire surface of the adsorbent layer.

The invention therefore provides a radial flow adsorption vessel comprising a cylindrical outer shell having a top end and a bottom end, wherein the top end is enclosed by a vessel head that provides a centrical opening usable as a port to introduce or to remove adsorbent particles into or from the vessel; at least one annular adsorption space disposed inside the shell that can be filled with the adsorbent particles, wherein the at least one annular adsorption space is defined by an outer and an inner cylindrical porous wall, both co-axially disposed inside the shell; and a loading device for the adsorbent particles positioned above the at least one annular adsorption space at the top end of the vessel, wherein the loading device comprises at least one conical element that extends radially to the outer cylindrical porous wall, wherein the at least one conical element provides a plurality of orifices arranged at least in a region sitting above the at least one annular adsorption space.

The integration of the loading device into the radial flow adsorption vessel allows to save time during the loading operation by eliminating the need to install and align said loading device. Further, the at least one conical element of the loading device that extends radially to the outer cylindrical porous wall and that provides a plurality of orifices arranged at least in a region sitting above the at least one annular adsorption space allows to control the flow rate of the adsorbent particles during loading and ensures a uniform distribution over the entire surface of the adsorption space at a slow enough rate to achieve a dense load.

The radial flow adsorption vessel comprises an outer and an inner cylindrical porous wall, both co-axially disposed inside the shell. Such radial flow adsorption vessels are, for example, described in US2020078722 (A1), whose content is incorporated herein by reference. Any one of the embodiments of the radial flow adsorption vessel as described in US2020078722 (A1) can be provided with the loading device as described herein Such porous walls commonly comprise perforated (metal) plates. The openings in the perforated plates are usually so big that adsorbent particles may pass through them. Therefore, the perforated plates provide typically an fine wire mesh overlay to retain the adsorbent particles.

The conical element of said loading device usually has a cone angle that is larger than the adsorbent's angle of repose. The cone angle is defined herein to be the angle between the basis of the cone and the conical limb.

The conical element may be formed by a multitude of sheet metal pieces that are joined together. A preferred material for the sheet metal pieces may be steel, though other metals such as stainless steel and/or aluminum are also acceptable.

The conical element apart from providing a plurality of orifices as described herein may be a solid wall or it may be perforated to allow faster and more uniform pressure changes within the space formed between the vessel head and the conical element during pressurization and depressurization. The purpose of these perforations is therefore to allow for pressure equalization across the conical element during process steps where there are sudden pressure changes in the annular adsorption space. If perforations are used, usually the whole surface shell of the conical element may provide the perforations that are formed by holes. A different hole size may be used for the perforations, but the center-to-center spacing of the perforation holes should remain 3 times the diameter. Further the hole size must be smaller than the adsorbent particles or the holes must be covered with a material such as woven wire mesh, which has openings smaller than the adsorbent particles.

The at least one conical element provides a plurality of orifices arranged at least in a region sitting above the at least one annular adsorption space. The plurality of orifices control the flow rate of the adsorbent particles during loading of the adsorbent and ensures uniform distribution over the surface of the adsorbent layer at a slow enough rate to achieve a dense load.

The orifices must fulfill different sizing criteria which depend on the nature of the particulate adsorbent material to be filled. At the one hand said orifices must be large enough to prevent bridging during filling of the adsorbent material. At the other hand the orifices should ensure a flow rate of the adsorbent particles that is slow enough to achieve a uniform dense load within the adsorption space to be filled. Further, the overall flow rate must be slow enough that a staff is always able to keep the space above the conical element full of adsorbent. Finally, the orifices must be spaced closely enough to uniformly disperse the adsorbent particles over the entire surface of the corresponding adsorption space or adsorbent layer, respectively.

Preferably, the plurality of orifices of the conical element are formed by round holes.

The plurality of orifices may also be formed by elongated slots that are staggered around the edge region of the cone element. Slots can be narrower than round holes without bridging and basically may achieve a better dispersion of the adsorbent material. Long slots, for example a 5 mm wide by 75 mm long slot, allow a reliable flow of the adsorbent material without bridging, but provide a too high overall flow rate. Shorter slots in turn tend to bridge shut during filling operation of the adsorbent material.

The at least one conical element may be rigidly connected to the vessel head by a multitude of standoff elements. These standoff element should provide a sharp cross-section with the point facing down toward the outside of the vessel to allows the sieve to flow around said standoff elements without forming a void behind it. The cross section of the connecting legs of the standoff elements in a plane perpendicular to the axis of the legs may therefore have rectangular shape.

The edges of the standoff elements pointing in the filling direction of the adsorbent particles may be tapered. This way, formation of voids in the adsorbent layer behind the standoff elements can be effectively avoided.

Furthermore, also the edges of the standoff elements pointing in the direction opposite to the filling direction of the adsorbent particles may be tapered.

The length of the standoff elements may be selected such that a uniform axial distance between the upper side of the conical element and the lower side of the conical-shaped vessel head is obtained. In this case, the standoff elements should all have the same length.

The standoff elements can be affixed at each end to the vessel head and the conical element independently by weld, adhesive, bolts, or any other fastener method familiar and apparent to one skilled in the art.

Usually, the top end and the bottom end of the shell both independently are enclosed by a head with hemispherical, torispherical, conical, flat or other geometry.

According to a preferred embodiment, the vessel head provides a conical geometry having a cone angle which is preferably larger than the adsorbent's angle of repose, and which may be the same cone angle as the at least one conical element, so that the vessel head and the conical element preferably provide both a cone angle slightly steeper than the adsorbent's angle of repose. This allows the adsorbent material to completely fill the head and pack tightly against it by the action of gravity alone. This constrains the adsorption layer and prevents it from fluidizing and prevents air bypass over the top of the adsorption layer.

The radial flow adsorption vessel according to the invention is designated to be filled with adsorbent particles. Different types of material may be used as adsorbent such as alumina, silica, zeolites, activated carbon, metal oxide sorbents, or crystalline organic frameworks with or without metals such as metal organic frameworks (MOFs), zeolitic imidazolate frameworks (ZIFs), or covalent organic frameworks (COFs).

The radial flow adsorption vessel according to the invention may be designed for U-flow, reverse U-flow or Z-flow geometry. In a U-flow geometry, the flow enters and exits from the same end of the vessel. In a Z-flow geometry, the flow enters and exits from opposite ends of the vessel. In a reverse U-flow geometry, the flow enters and exits the adsorbent bed from the same end of the vessel, but reverses direction in one of the flow passages such that the two streams exit the vessel at opposite ends.

Furthermore, usually an centrical opening for providing adsorbent particles is provided at the top end of the vessel, so that adsorbent particles may be filled into the designated annular adsorption space of the vessel by gravity flow.

Additionally, the at least one conical element provides a centrical port for providing adsorbent particles into the annular adsorption space. Said centrical port is closable by a cover element.

The at least one conical element may be sealingly connected to the outer cylindrical porous wall, preferably by a conical shelf-element. This is a loose-fitting seal that is suitable for preventing leakage of solid adsorbent, while having large gaps to ease fabrication. The conical shelf-element may be preassembled to the outer cylindrical porous wall, whereas the conical element may be preassembled to the vessel head. The head assembly may then be attached to the vessel with no need to make a perfect fit-up or install a tight seal between the conical element and the shelf-element.

In a preferred embodiment, radial flow adsorption vessel comprises at least one fluid permeable screen disposed co-axially between the outer and the inner cylindrical porous wall, wherein the at least one fluid permeable screen divides the at least one annular adsorption space into an outer annular adsorption space and an inner annular adsorption space.

The fluid permeable screen in the radial flow adsorption vessel may have a cylindrical shape which means that it is closed along its whole circumference and axial extension. The fluid permeable screen may be made out of several individual parts which do not extend over the whole circumference. The individual parts are then connected to each other to form a complete cylindrical screen. For example, individual parts may overlap to form the cylindrical screen. The individual parts may or may not be joined to one another.

The openings of the material forming the fluid permeable screen are usually selected so that adsorbent particles loaded into the annular adsorption spaces cannot pass through it.

Preferably, the fluid permeable screen comprises, more preferably consists of, a mesh wire, woven wire cloth or an expanded metal. These materials, which are also commonly used as an overlay for all perforated plates within this application, are especially well suited to be used as a fluid permeable screen in the present invention due to being lightweight and having openings small enough to retain the adsorbent particles.

Further preferred, the fluid permeable screen comprises, or consists of, a material in which the thickness of the ligaments t between the openings is small compared to the particle diameter d of the adsorbent. Preferably, the thickness t is equal to or smaller than 0.9 d, more preferably t is equal to or smaller than 0.75 d. The particle diameter d is defined as the equivalent diameter of a sphere that has the same volume of the particle, defined by the equation $d=2*(3*V/4*pi)^{1/3}$ where V is the volume of a particle and d is the equivalent spherical diameter of the given particle.

The fluid permeable screen usually comprises, more preferably consists of, a material having an open area of up to 45%. In preferred embodiments the open area may be equal to or smaller than 30%.

The permeable screen disposed co-axially between the outer and the inner cylindrical porous wall divides the one annular adsorption space into an outer annular adsorption space and an inner annular adsorption space. The outer annular adsorption space provides in the radial flow adsorption vessel of the present invention a narrow adsorbent layer that is difficult to access because it is a small target that is far from the centrical opening. The conical element of the loading device simplifies the loading process considerably.

Preferably, the conical element provides orifices at least, further preferred only, in the region sitting above the outer annular adsorption space.

The at least one fluid permeable screen may be axially spaced apart from the at least one conical element so that a gap is formed between the proximate end of the fluid permeable screen and the lower side of the conical element.

The orifices are preferably biased radially outward from the fluid permeable screen so that upon filling with adsorbent particles they bridge shut before the adsorbent flows over the screen.

Usually, the top portion of the outer cylindrical porous wall screen, which is disposed above the conical element may be either gas permeable or impermeable, depending on the needs of the process.

The loading device may comprise at least one further conical element that is disposed below the first conical element and that extends radially or is connected to the fluid permeable screen, wherein the at least one further conical element provides a plurality of second orifices arranged at least, preferably only, in a region sitting above the inner annular adsorption space.

The radial flow adsorption vessel may further comprise at least one further fluid permeable screen disposed co-axially between the first fluid permeable screen and the inner cylindrical porous wall, wherein the at least one further fluid permeable screen divides the inner annular adsorption space into a first and a second inner annular adsorption space. In this regard the loading device may additionally comprise at least one further conical element that is disposed below the second conical element and that extends radially or is connected to the second permeable screen, wherein the at least one further conical element provides a plurality of third orifices arranged at least, preferably only, in a region sitting above the second inner annular adsorption space.

One or more of the further conical elements may show the features of any one of the herein described embodiments of the configuration of the at least one conical element as applicable, for example, as regards its cone angle(s) and the nature of the plurality of orifices.

In particular, conical elements provided in order to fill a certain annular adsorption space within the vessel of the invention preferably provide a plurality of orifices only in the region sitting above the respective annular space. Furthermore, the orifices are preferably arranged so that they bridge shut before the adsorbent flows over into a neighbouring adsorbent space.

In a second aspect, the present invention provides a process for filling a radial flow adsorption vessel comprising the steps of providing the inventive radial flow adsorption vessel; and filling the annular adsorption space with adsorbent particles.

According to a preferred embodiment, a pretreat adsorbent material is loaded into the vessel comprising an inner and an outer annular adsorption space before a main adsorbent material. The cover element may be placed over the centrical port to prevent pretreat adsorbent material from entering into the inner annular adsorption space. Pretreat adsorbent material may be poured into the central opening until the space above the conical element is full. The adsorbent material flows through the orifices, which control the flow rate and distribute the adsorbent material around the outer adsorbent layer. The adsorbent material may be added continually as the space above the conical element empties. Filling the space above the conical element with pretreat adsorbent material results in capital savings and a performance benefit, because the main adsorbent material is much more expensive than the pretreat adsorbent material. After loading of the pretreat adsorbent material, the cover element may be removed and the main adsorbent material may be filled into the inner annular adsorption space, preferably by using a rotary device. Once the filling step of the main adsorbent material is completed, the rotary device may be removed, and the vessel head may be filled by dump or sock loading.

In a third aspect, the present invention provides an adsorption process wherein a radial flow adsorption vessel in any of the above described embodiments is filled with adsorbent particles and is used. This adsorption process may be a pressure, temperature, and/or vacuum swing adsorption process.

BRIEF DESCRIPTION OF THE DRAWINGS

The present invention will hereinafter be described in conjunction with the appended figures wherein like numerals denote like elements:

FIG. 10 shows a cross section of the third embodiment of FIG. 3 filled with a pretreat and main adsorbent material.

DETAILED DESCRIPTION

Figure 1:
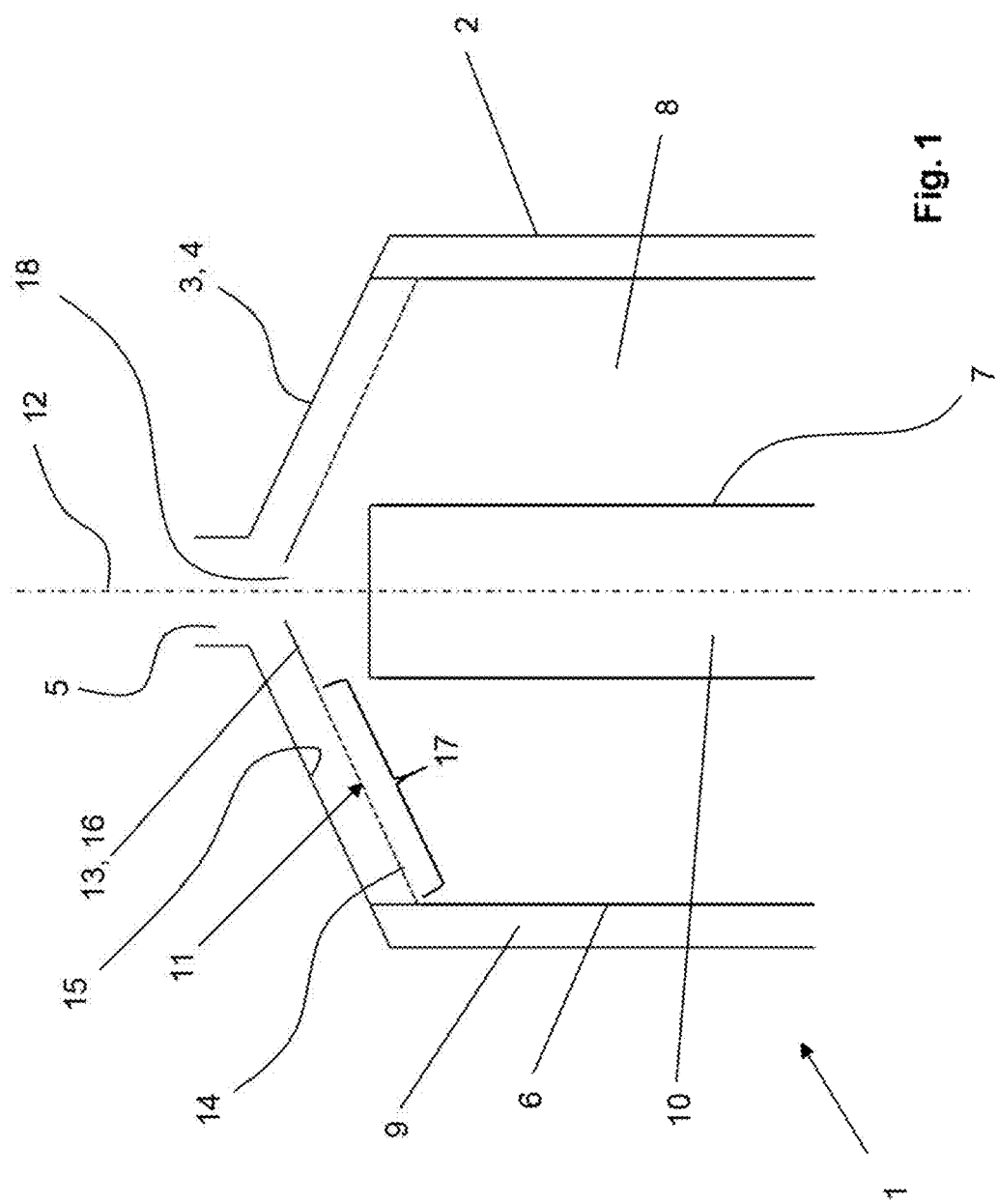
FIG. 1 shows a cross section of a first embodiment of the upper part of the radial flow adsorption vessel according to the invention.

FIGS. 1 to 7 illustrate different embodiments of the radial flow adsorption vessel of this invention and selected components thereof, wherein only those means and features are described that are necessary to illustrate the present invention.

FIGS. 1 to 7 illustrate an U-flow radial adsorption vessels with fluid entering at the bottom of the vessel, flowing radially from the outermost to the central annular adsorption space, and exiting the central annulus through a conduit at the bottom of the vessel. However, it should be noted that the present invention is not limited to such U-flow radial vessels as vessels according to the invention can be easily designed also for other radial flow geometries (i.e. reverse U-flow, Z-flow) as apparent to one skilled in the art.

In all embodiments of the radial flow adsorption vessel as depicted in FIGS. 1 to 7 and as described in the following, vessel 1 provides a cylindrical shell 2 with a first or top end 3 and a second or bottom end (not shown) both of which can be enclosed by a hemispherical, torispherical, conical, flat, or other vessel head 4 geometry. The vessel head 4 has at least one centrical opening 5 that is used as a port to introduce or to remove adsorbent into or from the vessel 1. Further, vessel 1 comprises an outer and an inner cylindrical porous wall 6, 7. Both cylindrical porous walls 6, 7 are co-axially disposed inside the shell 2 and define an annular adsorption space 8. The cylindrical shell 2 and outer cylindrical porous wall 6 define an outermost annular flow channel 9 that is in fluid communication with the fluid entering at the bottom of the vessel (not shown). The inner cylindrical porous wall 7 creates a central annulus 10 that in turn is in fluid communication with the conduit positioned in the bottom of the vessel 1 (not shown). Furthermore, all embodiments of the radial flow adsorption vessel 1 provides an integral loading device 11 that is a permanent part of the vessel 1.

In all embodiments of the radial flow adsorption vessel 1 as depicted in FIGS. 1 to 7 and as described in the following, in general different types of material may be used as adsorbent such as alumina, silica, zeolites, activated carbon, metal oxide sorbents, or crystalline organic frameworks with or without metals such as metal organic frameworks (MOFs), zeolitic imidazolate frameworks (ZIFs), or covalent organic frameworks (COFs) which are filled in particulate form into designated annular adsorption spaces 8, 19, 20, 29, 30. If several such spaces 8 are created in the vessel 1 they may be filled with different adsorbents, or, as the adsorbents are in particulate form, also the same adsorbent having different particle sizes and/or shapes may be filled into the different annular adsorption spaces 8, 19, 20, 29, 30.

In addition, all embodiments of the radial flow adsorption vessel as depicted in FIGS. 1 to 7 and as described in the following, the cylindrical porous walls 6, 7, such as the outer cylindrical porous wall 6 and inner cylindrical porous wall 7 are similar in design to containment screens found in prior art. For example, the cylindrical porous walls 6, 7 may consist of a perforated plate with large openings for fluid flow overlaid with a mesh screen or expanded metal whose openings are smaller in size than the adsorbent particles within the annular adsorption spaces 8, 19, 20, 29, 30.

Referring to FIG. 1, where a first embodiment of the upper part of the radial flow adsorption vessel 1 of the invention is described. Radial flow adsorption vessel 1 comprises a cylindrical outer shell 2 with a single annular adsorption space 8 disposed inside the shell 2 that is designated to be filled with an adsorbent. Said annular adsorption space 8 is defined by an outer cylindrical porous wall 6 and an inner cylindrical porous wall 7, both co-axially (with the same axis of symmetry 12) disposed inside the shell 2.

Figure 9:
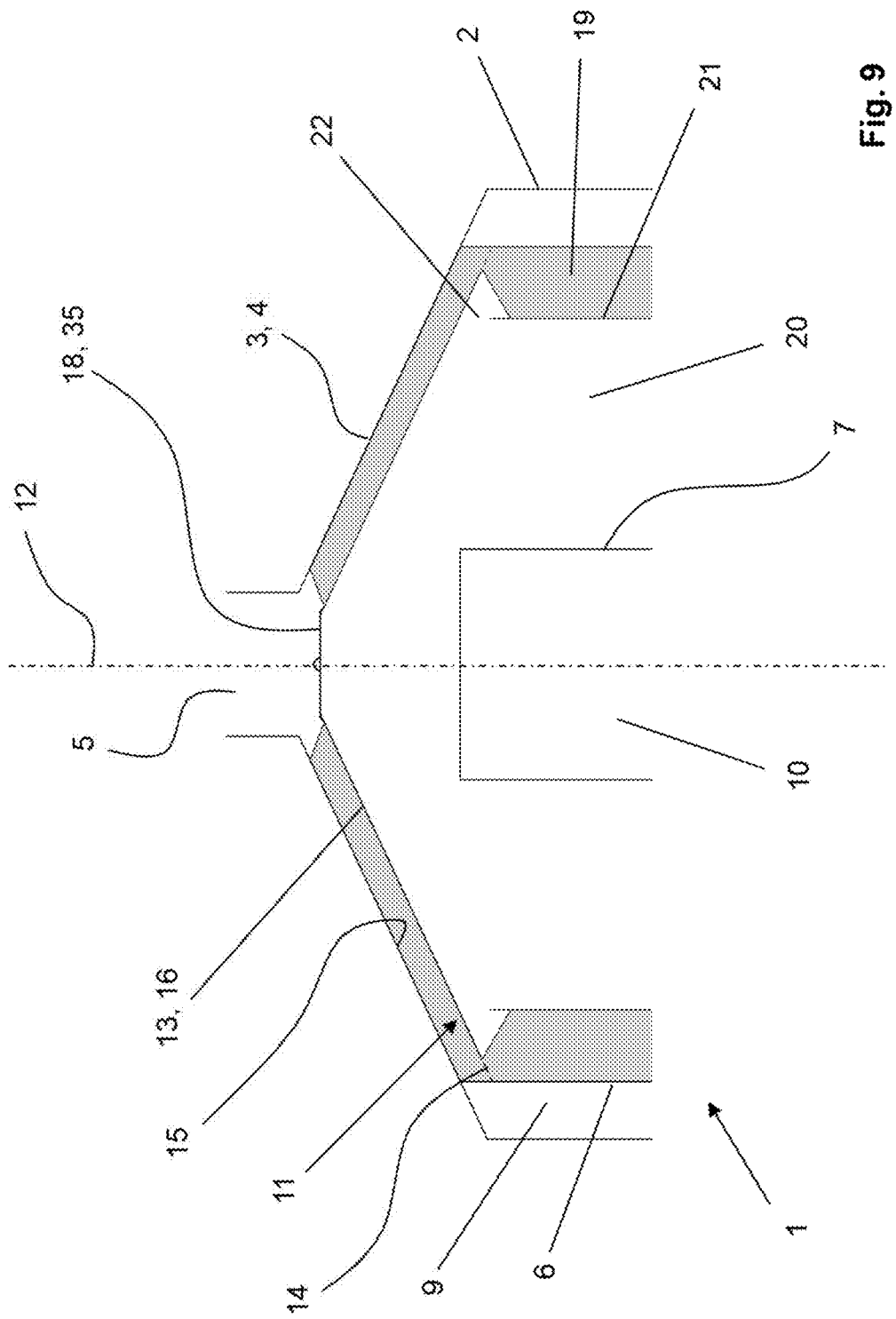
FIG. 9 shows a cross section of the third embodiment of FIG. 3 filled with a pretreat adsorbent material.

A loading device 11 is positioned above the single annular adsorption space 8 at the top end 3 of the vessel 1. The device 11 provides at the one hand the function to uniformly and densely load adsorbent into the vessel 1 and at the other hand to segregate the adsorbent in the vessel head 4 into multiple layers. The loading device 11 comprises in this variant one single conical element 13 that extends radially to the outer cylindrical wall 6 and provides a plurality of orifices 14 distributed above the annular adsorption space 8 to be loaded. The orifices 14 control the flow rate of sieve during loading and ensure uniform distribution over the entire surface of the annular adsorption space 8 at a slow enough rate to achieve a dense load. The loading device 11 is intended to be filled up until the orifices 14 bridge over and the space between the lower side 15 of the vessel head 4 and the upper side 16 of the conical element 14 is filled with the adsorbent. The plurality of orifices 14 of the conical element 13 that are formed in this variant by round holes are only arranged in a annular region 17 sitting above the annular adsorption space 8. The hole diameter is sufficiently large to prevent bridging during filling operation. Further, the conical element 13 provides a centrical port 18 that can be closed by a cover element 35 as shown in FIG. 9.

In practice, the conical element 13 is formed by a multitude of single sheet metal pieces that are joined together, for example by welding or a screwed joint. The single metal pieces may be made of steel.

As can be seen from FIG. 1, the vessel head 4 in this variant of the vessel 1 provides a conical geometry having the same cone angle as the conical element 13, wherein the cone angle is chosen larger than the adsorbent's angle of repose. This allows the adsorbent to completely fill the space between vessel head 4 and conical element 13 by the action of gravity alone.

Figure 2:
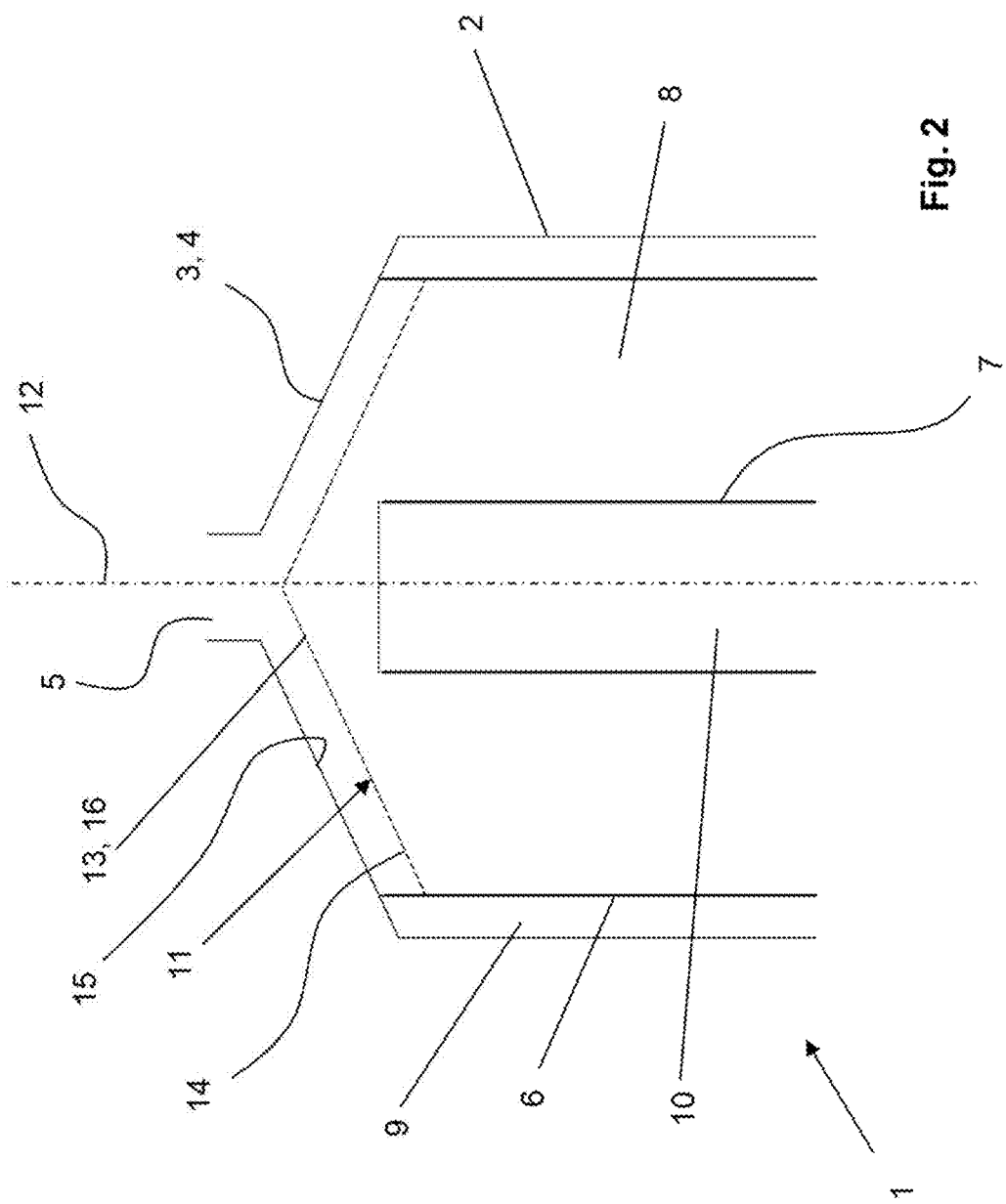
FIG. 2 shows a cross section of a second embodiment of the upper part of the radial flow adsorption vessel according to the invention.

Referring to FIG. 2, where a cross section of a second embodiment of the upper part of the radial flow adsorption vessel 1 according to the invention is illustrated. The vessel 1 provides basically the same general layout, but with a conical element 13 that extends over the entire annular adsorption space 8 and above the inner cylindrical porous wall 7. This variant of the conical element 13 design will lead to excess sieve in the center of the vessel 1, where the fill height above the inner screen is very small. As the conical element 13 do not comprise the centrical port 18 like the embodiment shown in FIG. 1, it prevents entry of the adsorbent into the vessel 1 from the centrical opening 5.

Figure 3:
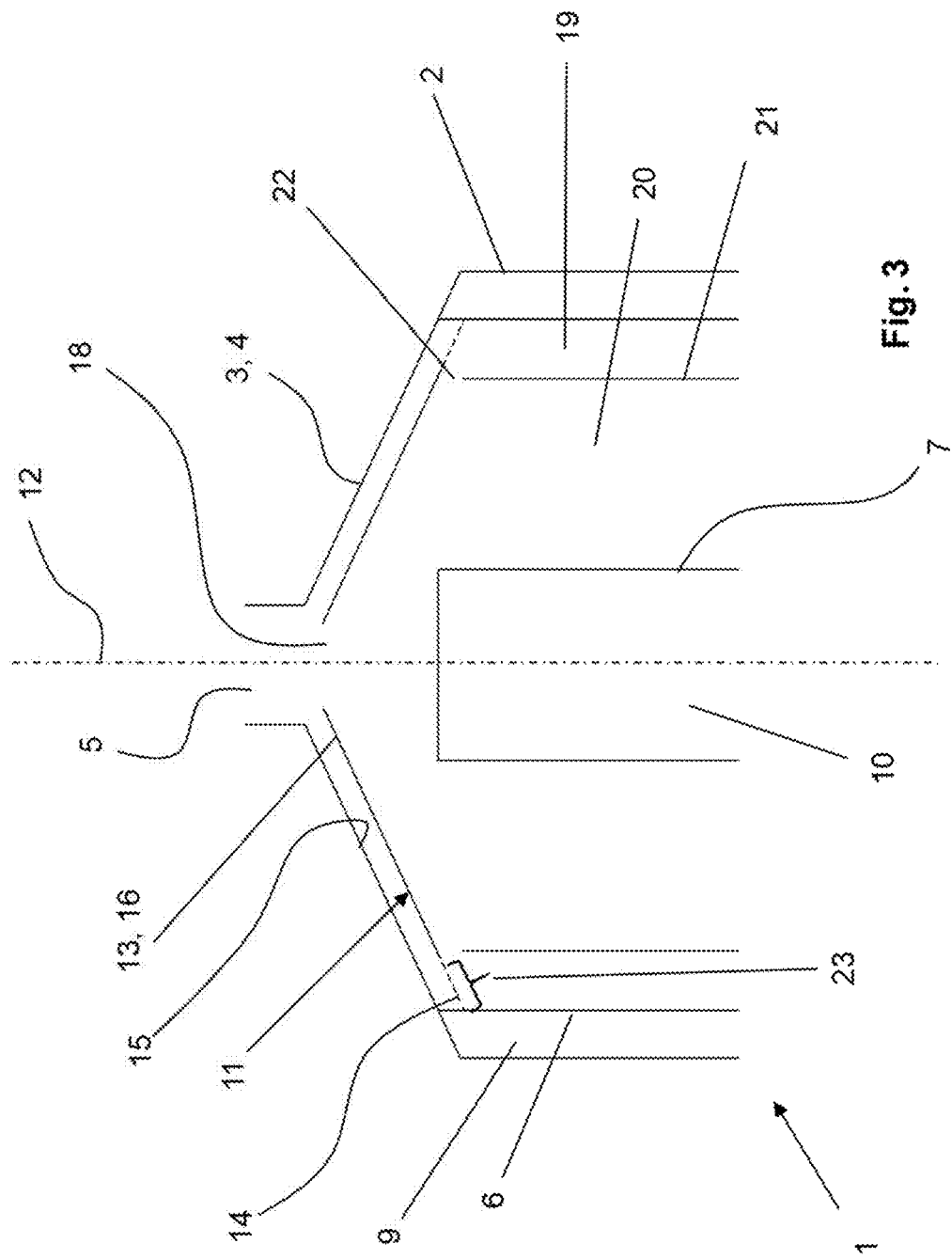
FIG. 3 shows a cross section of a third embodiment of the upper part of the radial flow adsorption vessel according to the invention.

FIG. 3 shows a cross section of a third embodiment of the upper part of the radial flow adsorption vessel 1 according to the invention. Radial flow adsorption vessel 1 comprises a cylindrical outer shell 2 with an outer annular adsorption space 19 and an inner annular adsorption space 20. The outer annular adsorption space 19 is disposed between the outer cylindrical porous wall 6 and a fluid permeable screen 21 that is in turn disposed co-axially between the outer cylindrical porous wall 6 and the inner cylindrical porous wall 7. The inner annular adsorption space 20 is disposed between the inner cylindrical porous wall 7 and the fluid permeable screen 21.

The fluid permeable screen(s) in all embodiments of the radial flow adsorption vessel 1 as depicted in FIGS. 3 to 7 is made of a flexible material such as wire mesh, woven wire cloth, or expanded metal. The flexibility of the fluid permeable screen material allows for the screen(s) to be shaped to match possible non-uniform contours that are formed during the rolling process and hence to create the corresponding annular adsorption spaces which have uniform depths in fluid flow direction.

The loading device 11 is also positioned at the top end 3 of the vessel 1. In this variant, the loading device 11 comprises one single conical element 13 that extends radially to the outer cylindrical wall 6 and provides a plurality of orifices 14. In comparison to the variant shown in FIGS. 1 and 2, the plurality of orifices 14 are arranged in a annular region 23 sitting above the outer annular adsorption space 19 and simplifies the loading process of the narrow formed outer annular adsorption space 19. The plurality of orifices 14 of the conical element 13 are also formed by round holes. The hole diameter is sufficiently large to prevent bridging during filling operation. The distance between the orifices 14 is closely enough to uniformly disperse the adsorbent particles over the entire surface of the outer annular adsorption space 19. The number, the size and the distribution of the plurality of orifices 14 around the circumference annular region 23 of the conical element 13 is in addition selected in such a manner that the overall flowrate is slow enough to achieve a dense load within the space 19 and is slow enough that a staff is always able to keep the space above the conical element 13 full of adsorbent. Further, the conical element 13 also provides the centrical port 18 that can be closed by the cover element 19 as shown in FIG. 9.

As can be seen in FIG. 3, the upper end of fluid permeable screen 21 is not connected to the conical element 13 so that a gap 22 is formed between the proximate end and the lower side of conical element 13. The size of the gap 22 is important for the filling operation of different adsorbents into the corresponding adsorption space 19, 20. Therefore, the proximate end of the fluid permeable screen 21 should be high enough to prevent a first adsorbent from overflowing into the inner annular adsorption space 20. At the other hand, the gap 22 should be big enough to allow a second adsorbent to overflow from the inner annular adsorption space 20 into the outer annular adsorption space 19 as will be described further below.

Figure 4:
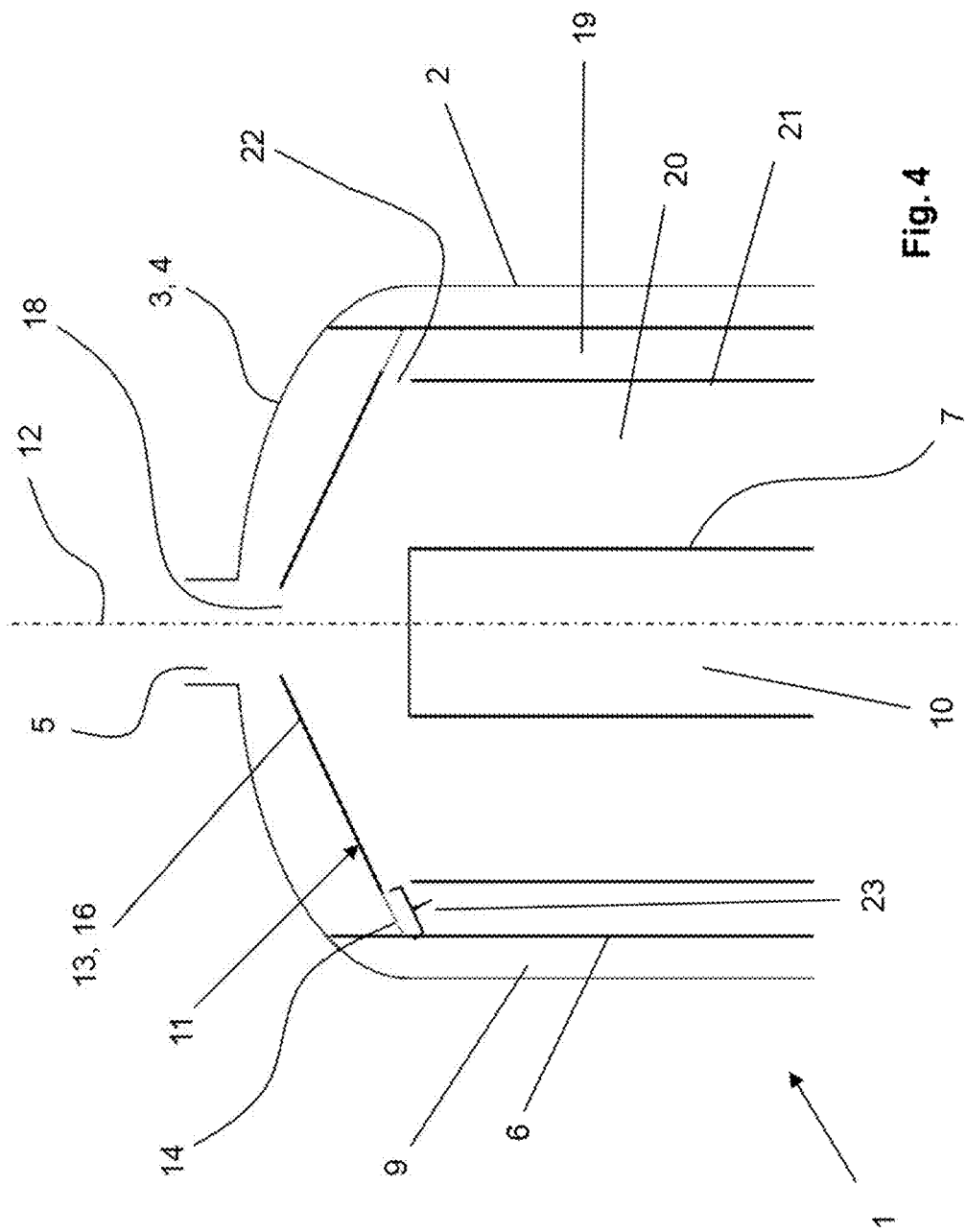
FIG. 4 shows a cross section of a fourth embodiment of the upper part of the radial flow adsorption vessel according to the invention.

FIG. 4 shows a cross section of a fourth embodiment of the upper part of the radial flow adsorption vessel 1 according to the invention. In comparison to the preceding embodiment shown in FIG. 3, vessel 1 comprises a vessel head 4 that provides a hemispherical geometry. Such a dished geometry of the vessel head 4 is a more standard pressure vessel geometry and is therefore lower-cost. However, said geometry is more suitable when fluidization is not a concern and if fluid bypassing can be shown to be limited.

Figure 5:
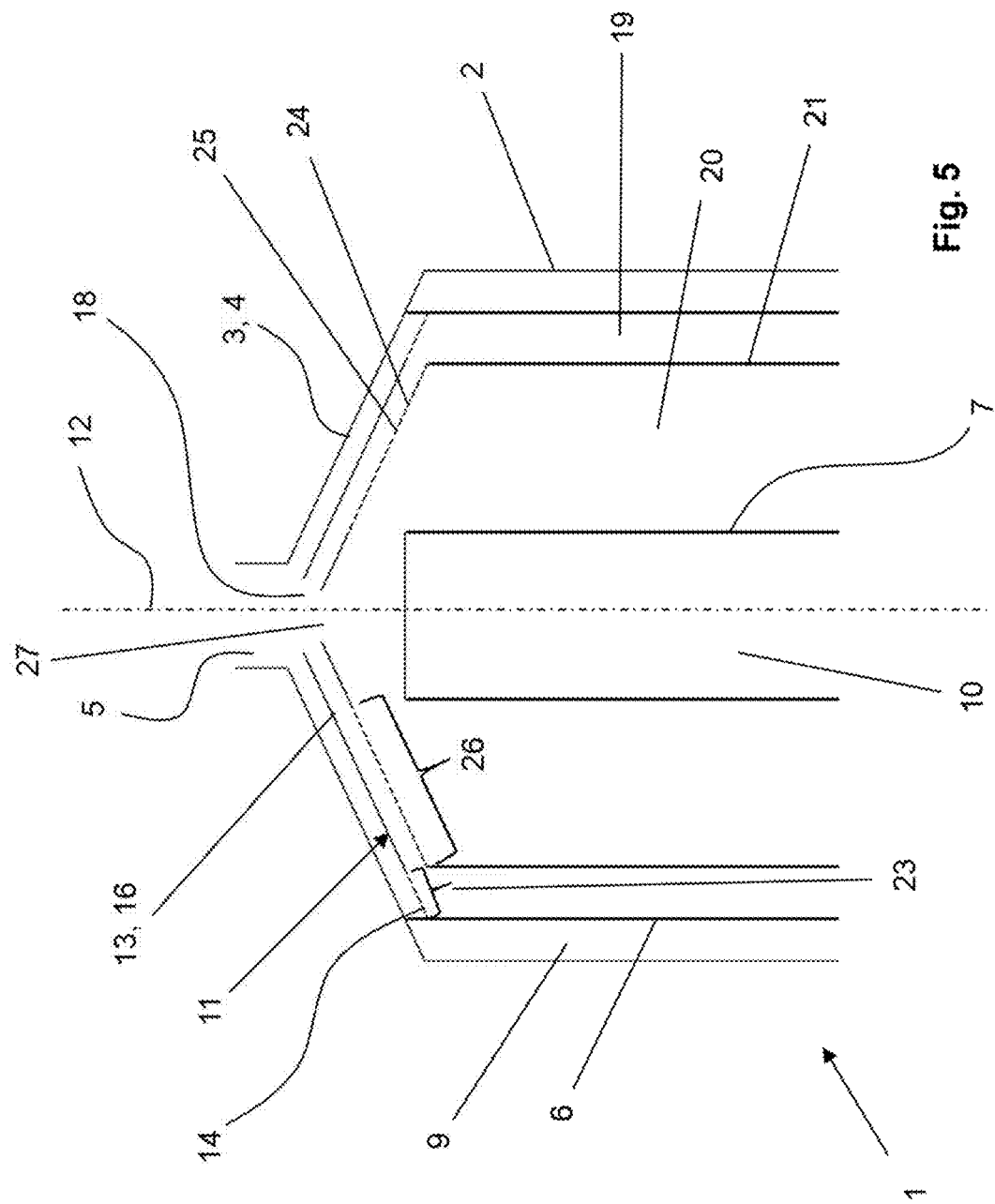
FIG. 5 shows a cross section of a fifth embodiment of the upper part of the radial adsorption vessel according to the invention.

In the embodiment shown in FIG. 5, loading device 11 comprises a further conical element 24. The loading device 11 comprises in this variant therefore a first conical element 13 that extends radially to the outer cylindrical wall 6 and provides a plurality of orifices 14 that are arranged in the annular region 23 sitting above the outer annular adsorption space 19 and simplifies the loading process of the narrow outer annular adsorption space 19 that is usually difficult to access. The second conical element 24 is disposed under the first conical element 13 and extends radially to the fluid permeable screen 21. It provides a plurality of orifices 25. The plurality of orifices 25 of the second conical element 24 are formed by round holes and are only disposed in an annular region 26 sitting above the inner annular adsorption space 20. The orifices 14, 25 control the flow rate of sieve during loading and ensure uniform distribution over the entire surface of the corresponding annular adsorption space 19, 20 at a slow enough rate to achieve a dense load. Further, the conical element 24 also provides a centrical port 27 that can be closed by a cover element (not shown).

Figure 6:
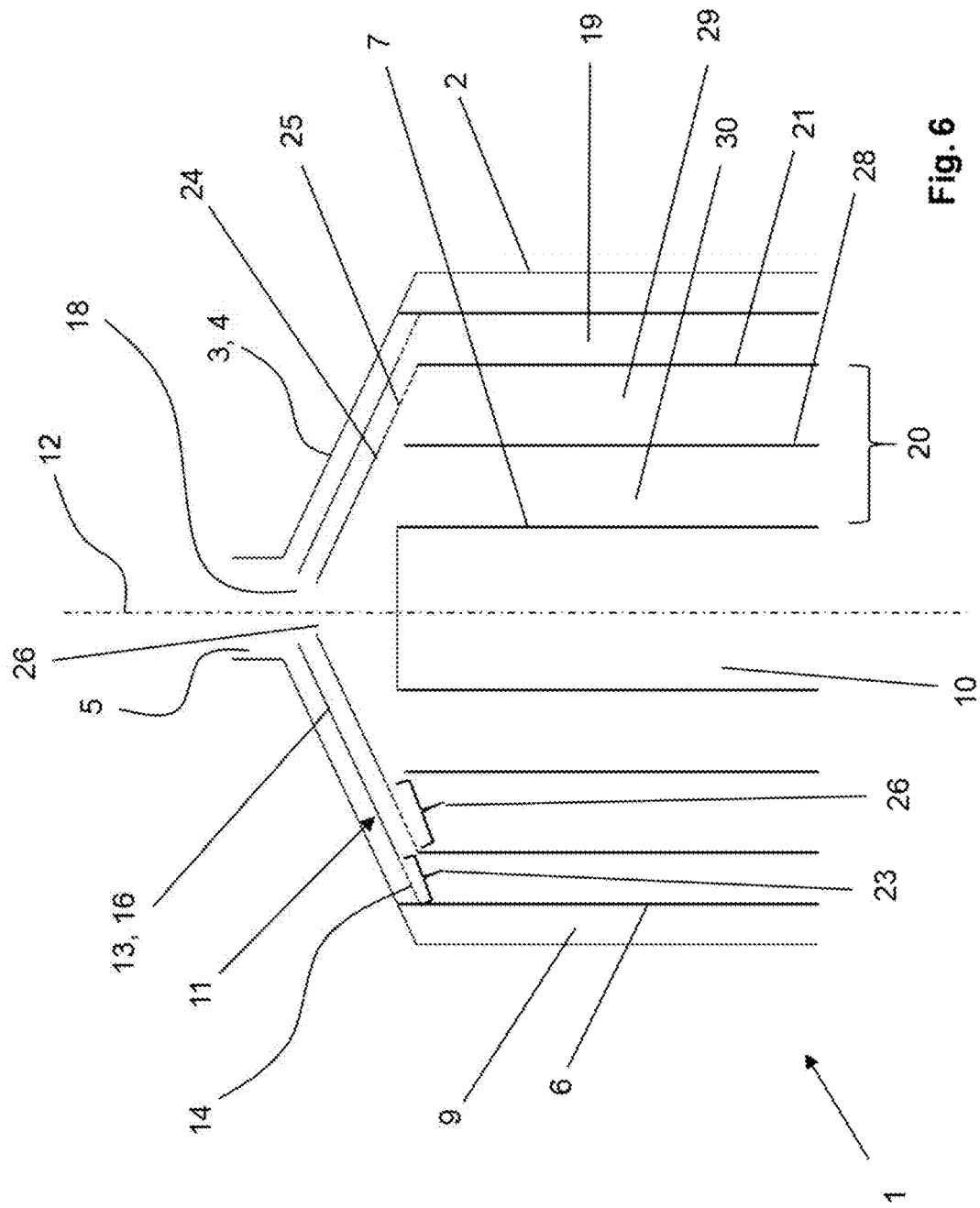
FIG. 6 shows a cross section of a sixth embodiment of the upper part of the radial adsorption vessel according to the invention

FIG. 6 shows a cross section of a sixth embodiment of the upper part of the radial flow adsorption vessel 1 according to the invention. In comparison to the preceding embodiment shown in FIG. 5, vessel 1 comprises a second fluid permeable screen 28 that is disposed co-axially to inner cylindrical porous wall 7 between said wall 7 and the first fluid permeable screen 21. The second fluid permeable screen 28 divides the inner annular adsorption space 20 into a first inner annular adsorption space 29 and a second inner annular adsorption space 30.

Figure 7:
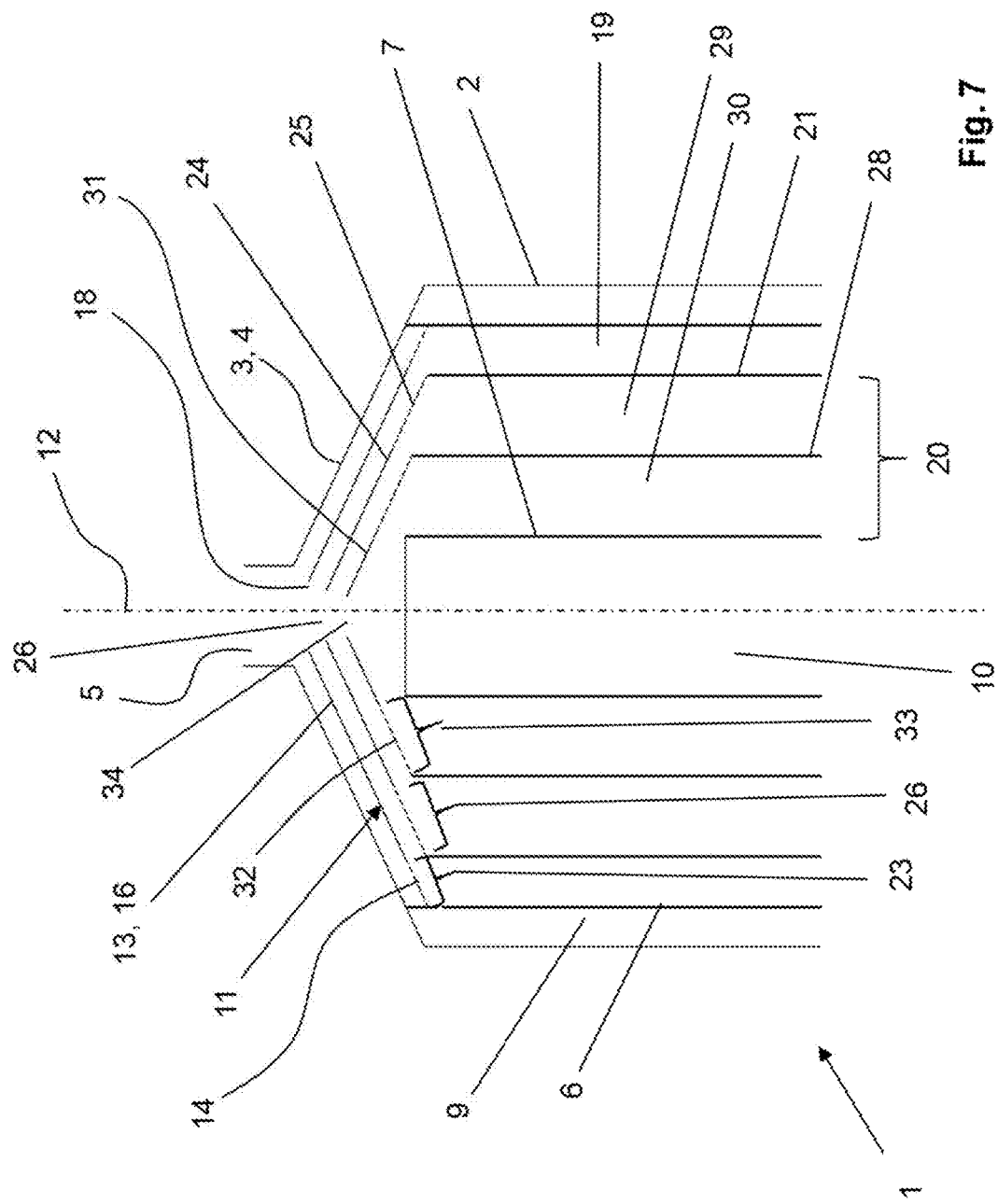
FIG. 7 shows a cross section of a seventh embodiment of the upper part of the radial adsorption vessel according to the invention.

FIG. 7 shows a cross section of a seventh embodiment of the upper part of the radial flow adsorption vessel 1 according to the invention, wherein loading device 11 comprises a further conical element, namely the third conical element 31. The loading device 11 comprises in this variant the first conical element 13 that extends radially to the outer cylindrical wall 6 having the plurality of orifices 14 and that are disposed in the annular region 23 sitting above the outer annular adsorption space 19. The second conical element 24 is disposed under the first conical element 13 and extends radially to the first fluid permeable screen 21 having the plurality of orifices 25 distributed above the first inner annular adsorption space 29. The third conical element 31 is disposed under the second conical element 24 and extends radially to the second fluid permeable screen 28 having a plurality of orifices 32 distributed above the second inner annular adsorption space 30. The plurality of orifices 30 of the third conical element 31 are formed by round holes and are only arranged in an annular region 33 sitting above the second inner annular adsorption space 30. The orifices 14, 25, 32 control the flow rate of sieve during loading and ensure uniform distribution over the entire surface of the corresponding annular adsorption space 19, 29, 30 at a slow enough rate to achieve a dense load. Further, the third conical element 31 also provides a centrical port 34 that can be closed by a cover element (not shown).

Figure 8:
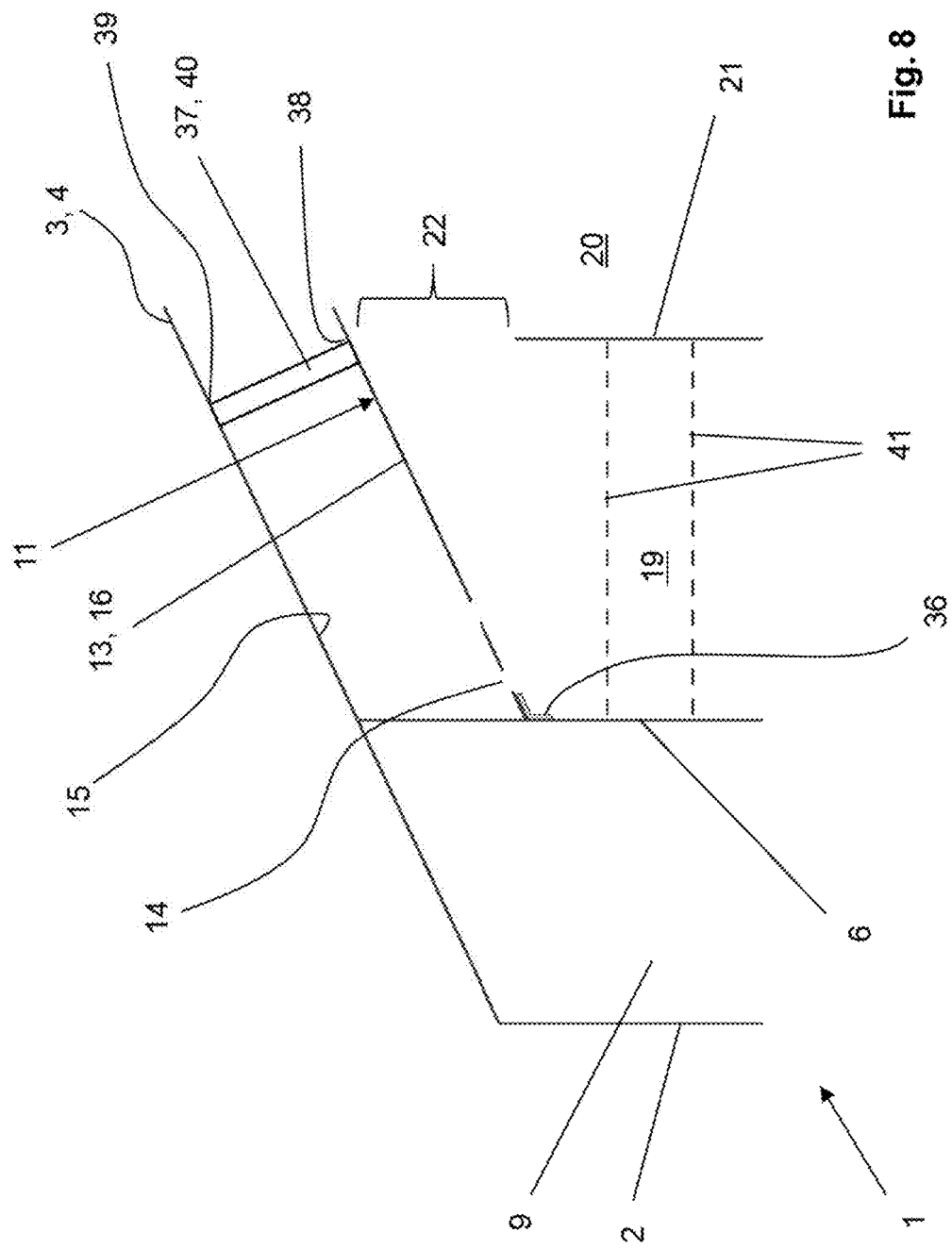
FIG. 8 shows a cross section of the third embodiment of FIG. 3 with further optional features.

FIG. 8 shows a cross section of the third embodiment of FIG. 3 with further optional features. As can be seen in said figure, the conical element 13 or each other conical element 24, 31 may be sealingly connected to the outer cylindrical porous wall 6 or the corresponding fluid permeable screen 21, 28 by a conical shelf-element 36. This shelf-element 36 is a loose-fitting seal that is suitable for preventing leakage of solid adsorbents, while having large gaps to ease fabrication. The conical shelf-element 36 may be preassembled to the outer porous wall 6 or the corresponding fluid permeable screen 21, 28.

The conical element 13 may be preassembled and rigidly connected to the vessel head 4 by a multitude of standoff elements 37 so that the corresponding head assembly can be then attached to the vessel 1 with no need to make a perfect fit-up or install a tight seal between the conical element 13 and the shelf-element 36. Solid adsorbents will not flow up over the shelf-element 36, so gaps of several particle diameters are permissible and will not allow leakage during filling.

The multitude of standoff elements 37 can be made from extruded aluminum channel, rolled steel channel, formed steel plates or other materials. The choice of material and product form can be made based on metallurgical requirements for a process or to maintain tight tolerance on the distance from a first to a second end of the standoff elements 37 where extruded or rolled products will be more accurate than manually formed or welded products.

Referring to FIG. 8, standoff element 37 includes a first end 38 connected to the upper side 16 of the conical element 13, a second end 39 connected to the lower side 15 of the conical-shaped vessel head 4, and a connecting leg 40. The length of the connecting leg 40 is selected such that a uniform axial distance between conical element 13 and conical-shaped vessel head 4 is obtained. The edges of the standoff elements 37 pointing in the filling direction of the adsorbent particles are tapered (not shown). Such a shape allows the sieve to flow around the standoff elements 37 during loading of the adsorbent particles so that the formation of voids behind the standoff elements 37 can avoided as far as possible.

The standoff elements 37 must have sufficient strength and stiffness to support the conical element 13 from the vessel head 4 during loading of adsorbent material. The standoff elements 37 can use any pitch layout, such as square or triangular.

Referring further to FIG. 8, each of the annular reactions spaces 19, or 20, 29, 30 may comprise one or more coarse-screen(s) 41 near the orifices 14, 25, 32 to deflect the adsorbent particles and help to disperse it more uniformly over the surface of the corresponding annular adsorption space 19, 20, 29, 30.

EXAMPLE

A radial flow adsorption vessel 1 configured like that shown in FIG. 3 was provided including an outer cylindrical porous wall 6 with a diameter of 4 m and a fluid permeable screen 21 with a diameter of 3.6 m. The vessel furthermore comprised an inner cylindrical porous wall 7 with a diameter of 1 m, which was not connected to the outer porous wall or the fluid permeable screen. The total height, i.e. longitudinal extension, of the porous walls 6, 7 and the screen 21 was 4.5 m. Both porous walls 6, 7 were made from 6 mm thick perforated steel plate with an open area of 45%, overlaid with a wire mesh.

The fluid permeable screen 21 consisted of a woven wire mesh material that had openings small enough to contain the smallest sieve particles.

The vessel 1 was enclosed by a conical-shaped vessel head 4 providing a conical element 13. The conical element 13 was formed by a multitude of steel plates and provides a cone angle of 30°. The circumference region comprised a plurality of orifices 14. The orifices 14 were round holes with a diameter of 11.1 mm. The 128 orifices were distributed over the circumference region sitting above the outer annular adsorption space 19. Referring to FIGS. 9 and 10, a pretreat adsorbent material (8×12 mesh spherical particles with a diameter of 1.7-2.4 mm; and with an average particle size of 2 mm) was loaded before the main adsorbent material. A temporary cover element 35 was placed over the centrical port 18 in the conical element 13 to prevent pretreat adsorbent material from entering into the inner annular adsorption space 20. Pretreat adsorbent material was poured into the centrical opening 5 until the space above the conical element 13 was full. The adsorbent material flows through the orifices 14, which control the flow rate and distribute the adsorbent around the space circumference. The adsorbent material was added continually as the space above the conical element 13 empties. When the outer annular adsorption space 19 was full, the orifices 14 bridged shut and stopped the flow into the space 19. A mound of adsorbent material below the orifices 19 that slopes from the outer edge of the orifice 14 to the fluid permeable screen 21 at its angle of repose was formed. After loading the pretreat adsorbent material, the cover element 35 was removed and the inner annular adsorption space 20 was filled with the main adsorbent material by using a typical rotary device (not shown) supplied and operated by an adsorbent loading contractor. When the inner annular adsorption space 20 was filled, main adsorbent material flows over the gap 22 into the outer annular adsorption space 19. The main adsorbent material can fulfill the function of the pretreat adsorbent material, so it can occupy this space without affecting the process. The main adsorbent material is considerably more expensive than the pretreat adsorbent material, so it is still desirable to maintain two separate layers. The gap 22 between the fluid permeable screen 21 and the conical element 13 is important. If this gap 22 is too large, pretreat adsorbent material can flow over the fluid permeable screen 21 and into the inner annular adsorption space 20. The fluid permeable screen 21 must be high enough, such that the adsorbent can fill from the orifices 14 to the fluid permeable screen 21 at its angle of repose without flowing over the top and into the inner annular adsorption space 20. The gap 22 must also be large enough that main adsorbent material can flow freely through it, allowing the main adsorbent material to fill in all voids at the top of the pretreat adsorbent material layer. This gap is 43 mm+1-15 mm for the oxygen VSA application.

Once the adsorbent material was filled into the head space, the rotary device was removed, and the head was filled by dump or sock loading. Density in the head space was not as critical as the main bed in inner space 20 and a lower density in this region was shown to be beneficial. Main adsorbent material was filled to the top of the manway. It was possible to stop filling the main adsorbent material short of the top and switch back to pretreat adsorbent material or inert material for further performance benefits.

Filling the space above the conical element 13 with pretreat adsorbent material results in both capital savings and a performance benefit as the main adsorbent material is much more expensive than the pretreat adsorbent material. It also has a lower nitrogen capacity, which improves the performance. The adsorbent in the top head was not used by the process, but it had to be pressurized and depressurized with the vessel 1. Pressurizing the main adsorbent material required a great deal of nitrogen, which took additional feed air and had a cost in power and pressurization time. When the head was depressurized, the desorbed nitrogen passed through the inner annular adsorption space 20, causing maldistribution and a deterioration in performance. The distance between the top head and the conical element 13 was maximized to limit the overall adsorbent and optimize performance.

REFERENCES

1 vessel
2 cylindrical outer shell
3 top end
4 vessel head
5 centrical opening
6 outer cylindrical porous wall
7 inner cylindrical porous wall
8 annular adsorption space
9 outermost annular flow channel
10 central annulus
11 loading device
12 axis of symmetry
13 first conical element
14 orifices
15 lower side of vessel head
16 upper side of conical element
17 annular region
18 centrical port
19 outer annular adsorption space
20 inner annular adsorption space
21 first fluid permeable screen
22 gap
23 annular region
24 second conical element
25 orifices
26 annular region
27 centrical port
28 second fluid permeable screen
29 first inner annular adsorption space
30 second inner annular adsorption space
31 third conical element
32 orifices
33 annular region
34 centrical port
35 cover element
36 conical shelf-element
37 standoff element
38 first end
39 second end
40 connecting leg
41 coarse screen

The invention claimed is:

1. A radial flow adsorption vessel comprising:
a cylindrical outer shell having a top end and a bottom end, wherein the top end is enclosed by a vessel head that provides a centrical opening usable as a port to introduce or to remove adsorbent particles into or from the vessel;
at least one annular adsorption space disposed inside the shell that can be filled with the adsorbent particles, wherein the at least one annular adsorption space is defined by an outer cylindrical porous wall and an inner cylindrical porous wall, both the outer cylindrical porous wall and the inner cylindrical porous wall being co-axially disposed inside the shell; and
a loading device for the adsorbent particles positioned above the at least one annular adsorption space at a top end of the vessel, wherein the loading device comprises at least one conical element that extends radially to the outer cylindrical porous wall, wherein the at least one conical element provides a plurality of orifices arranged at least in a region sitting above the at least one annular adsorption space;
the vessel head having a conical geometry having a cone angle that is larger than an angle of repose of the adsorbent particles and the at least one conical element having a cone angle that is steeper than the angle of repose.

2. The radial flow adsorption vessel according to claim 1, comprising at least one fluid permeable screen disposed co-axially between the outer and the inner cylindrical porous wall, wherein the at least one fluid permeable screen divides the at least one annular adsorption space into an outer annular adsorption space and an inner annular adsorption space, and wherein the at least one conical element provides orifices only in the region sitting above the outer annular adsorption space.

3. A process for filling a radial flow adsorption vessel comprising the steps:
providing a radial flow adsorption vessel according to claim 1, and
filling the at least one annular adsorption space with adsorbent particles.

4. An adsorption process comprising:
providing a radial flow adsorption vessel according to claim 1; and
filling the annular adsorption space of the radial flow adsorption vessel with adsorbent particles.

5. The adsorption process according to claim 4, wherein the process is a temperature swing adsorption process, pressure swing adsorption process and/or vacuum swing adsorption process.

6. A radial flow adsorption vessel comprising:
a cylindrical outer shell having a top end and a bottom end, wherein the top end is enclosed by a vessel head that provides a centrical opening usable as a port to introduce or to remove adsorbent particles into or from the vessel;
at least one annular adsorption space disposed inside the shell that can be filled with the adsorbent particles, wherein the at least one annular adsorption space is defined by an outer cylindrical porous wall and an inner cylindrical porous wall, both the outer cylindrical porous wall and the inner cylindrical porous wall being co-axially disposed inside the shell; and
a loading device for the adsorbent particles positioned above the at least one annular adsorption space at a top end of the vessel, wherein the loading device comprises at least one conical element that extends radially to the outer cylindrical porous wall, wherein the at least one conical element provides a plurality of orifices arranged at least in a region sitting above the at least one annular adsorption space;
wherein the at least one conical element is rigidly connected to the vessel head by a multitude of standoff elements.

7. The radial flow adsorption vessel according to claim 6, wherein the edges of the standoff elements pointing in a filling direction of the adsorbent particles are tapered.

8. The radial flow adsorption vessel according to claim 6, wherein the vessel head is conical-shaped and wherein lengths of the standoff elements are selected such that there is a uniform axial distance between an upper side of the at least one conical element and a lower side of the vessel head.

9. A radial flow adsorption vessel comprising:
a cylindrical outer shell having a top end and a bottom end, wherein the top end is enclosed by a vessel head that provides a centrical opening usable as a port to introduce or to remove adsorbent particles into or from the vessel;
at least one annular adsorption space disposed inside the shell that can be filled with the adsorbent particles, wherein the at least one annular adsorption space is defined by an outer cylindrical porous wall and an inner cylindrical porous wall, both the outer cylindrical porous wall and the inner cylindrical porous wall being co-axially disposed inside the shell; and
a loading device for the adsorbent particles positioned above the at least one annular adsorption space at a top end of the vessel, wherein the loading device comprises at least one conical element that extends radially to the outer cylindrical porous wall, wherein the at least one conical element provides a plurality of orifices arranged at least in a region sitting above the at least one annular adsorption space;
wherein the at least one conical element provides a centrical port that is closable by a cover element.

10. The radial flow adsorption vessel according to claim 9, wherein the vessel head provides a hemispherical, a torispherical, a conical, a flat or other geometry.

11. The radial flow adsorption vessel according to claim 10, wherein the vessel head provides a conical geometry having a cone angle which is larger than an angle of repose of the adsorbent particles.

12. A radial flow adsorption vessel comprising:
a cylindrical outer shell having a top end and a bottom end, wherein the top end is enclosed by a vessel head that provides a centrical opening usable as a port to introduce or to remove adsorbent particles into or from the vessel;
at least one annular adsorption space disposed inside the shell that can be filled with the adsorbent particles, wherein the at least one annular adsorption space is defined by an outer cylindrical porous wall and an inner cylindrical porous wall, both the outer cylindrical porous wall and the inner cylindrical porous wall being co-axially disposed inside the shell; and
a loading device for the adsorbent particles positioned above the at least one annular adsorption space at a top end of the vessel, wherein the loading device comprises at least one conical element that extends radially to the outer cylindrical porous wall, wherein the at least one conical element provides a plurality of orifices arranged at least in a region sitting above the at least one annular adsorption space;
wherein the at least one conical element is sealingly connected to the outer cylindrical porous wall.

13. A radial flow adsorption vessel comprising:
a cylindrical outer shell having a top end and a bottom end, wherein the top end is enclosed by a vessel head that provides a centrical opening usable as a port to introduce or to remove adsorbent particles into or from the vessel;
at least one annular adsorption space disposed inside the shell that can be filled with the adsorbent particles, wherein the at least one annular adsorption space is defined by an outer cylindrical porous wall and an inner cylindrical porous wall, both the outer cylindrical porous wall and the inner cylindrical porous wall being co-axially disposed inside the shell;
a loading device for the adsorbent particles positioned above the at least one annular adsorption space at a top end of the vessel, wherein the loading device comprises at least one conical element that extends radially to the outer cylindrical porous wall, wherein the at least one conical element provides a plurality of orifices arranged at least in a region sitting above the at least one annular adsorption space; and
at least one fluid permeable screen disposed co-axially between the outer cylindrical porous wall and the inner cylindrical porous wall, wherein the at least one fluid permeable screen divides the at least one annular adsorption space into an outer annular adsorption space and an inner annular adsorption space, and wherein the at least one conical element provides orifices only in the region sitting above the outer annular adsorption space;

wherein the at least one fluid permeable screen is axially spaced apart from the at least one conical element so that a gap is formed between the proximate end of the at least one fluid permeable screen and the lower side of the at least one conical element.

14. A radial flow adsorption vessel comprising:
a cylindrical outer shell having a top end and a bottom end, wherein the top end is enclosed by a vessel head that provides a centrical opening usable as a port to introduce or to remove adsorbent particles into or from the vessel;
at least one annular adsorption space disposed inside the shell that can be filled with the adsorbent particles, wherein the at least one annular adsorption space is defined by an outer cylindrical porous wall and an inner cylindrical porous wall, both the outer cylindrical porous wall and the inner cylindrical porous wall being co-axially disposed inside the shell;
a loading device for the adsorbent particles positioned above the at least one annular adsorption space at a top end of the vessel, wherein the loading device comprises at least one conical element that extends radially to the outer cylindrical porous wall, wherein the at least one conical element provides a plurality of orifices arranged at least in a region sitting above the at least one annular adsorption space; and
at least one fluid permeable screen disposed co-axially between the outer cylindrical porous wall and the inner cylindrical porous wall, wherein the at least one fluid permeable screen divides the at least one annular adsorption space into an outer annular adsorption space and an inner annular adsorption space, and wherein the at least one conical element provides orifices only in the region sitting above the outer annular adsorption space;
wherein the orifices are biased radially outward from the at least one fluid permeable screen so upon filling with adsorbent particles they bridge shut before the adsorbent flows over the screen.

15. A radial flow adsorption vessel comprising:
a cylindrical outer shell having a top end and a bottom end, wherein the top end is enclosed by a vessel head that provides a centrical opening usable as a port to introduce or to remove adsorbent particles into or from the vessel;
at least one annular adsorption space disposed inside the shell that can be filled with the adsorbent particles, wherein the at least one annular adsorption space is defined by an outer cylindrical porous wall and an inner cylindrical porous wall, both the outer cylindrical porous wall and the inner cylindrical porous wall being co-axially disposed inside the shell;
a loading device for the adsorbent particles positioned above the at least one annular adsorption space at a top end of the vessel, wherein the loading device comprises at least one conical element that extends radially to the outer cylindrical porous wall, wherein the at least one conical element provides a plurality of orifices arranged at least in a region sitting above the at least one annular adsorption space; and
at least one fluid permeable screen disposed co-axially between the outer cylindrical porous wall and the inner cylindrical porous wall, wherein the at least one fluid permeable screen divides the at least one annular adsorption space into an outer annular adsorption space and an inner annular adsorption space, and wherein the at least one conical element provides orifices only in the region sitting above the outer annular adsorption space;
wherein the outer annular adsorption space comprises one or more coarse screens disposed in its upper region.

16. A radial flow adsorption vessel comprising:
a cylindrical outer shell having a top end and a bottom end, wherein the top end is enclosed by a vessel head that provides a centrical opening usable as a port to introduce or to remove adsorbent particles into or from the vessel;
at least one annular adsorption space disposed inside the shell that can be filled with the adsorbent particles, wherein the at least one annular adsorption space is defined by an outer cylindrical porous wall and an inner cylindrical porous wall, both the outer cylindrical porous wall and the inner cylindrical porous wall being co-axially disposed inside the shell;
a loading device for the adsorbent particles positioned above the at least one annular adsorption space at a top end of the vessel, wherein the loading device comprises at least one conical element that extends radially to the outer cylindrical porous wall, wherein the at least one conical element provides a plurality of orifices arranged at least in a region sitting above the at least one annular adsorption space; and
at least one fluid permeable screen disposed co-axially between the outer cylindrical porous wall and the inner cylindrical porous wall, wherein the at least one fluid permeable screen divides the at least one annular adsorption space into an outer annular adsorption space and an inner annular adsorption space, and wherein the at least one conical element provides orifices only in the region sitting above the outer annular adsorption space;
wherein the at least one conical element comprises a first conical element and wherein the loading device comprises at least one further conical element that is disposed below the first conical element and that extends radially or is connected to the at least one fluid permeable screen, wherein the at least one further conical element provides a plurality of orifices arranged at least in a region sitting above the inner annular adsorption space.

17. The radial flow adsorption vessel according claim 16, wherein the at least one fluid permeable screen comprises a first fluid permeable screen and the radial adsorption vessel also comprising at least one further fluid permeable screen disposed co-axially between the first fluid permeable screen and the inner cylindrical porous wall, wherein the at least one further fluid permeable screen divides the inner annular adsorption space into a first inner annular adsorption space and a second inner annular adsorption space.

18. The radial flow adsorption vessel according to claim 17, wherein the at least one further fluid permeable screen comprises a second fluid permeable screen and the at least one further conical element comprises a second conical element and wherein the loading device comprises at least one third conical element that is disposed below the second conical element and that extends radially or is connected to the second permeable screen, wherein the at least one third conical element provides a plurality of orifices arranged at least in a region sitting above the second inner annular adsorption space.

* * * * *